(12) United States Patent
Brewer et al.

(10) Patent No.: US 11,704,221 B2
(45) Date of Patent: Jul. 18, 2023

(54) SYSTEMS AND METHODS FOR COLLECTING, TRACKING, AND STORING SYSTEM PERFORMANCE AND EVENT DATA FOR COMPUTING DEVICES

(71) Applicant: Assurant, Inc., New York, NY (US)

(72) Inventors: Dustin Brewer, Lakewood, OH (US); Stuart Saunders, Lakewood, OH (US); Cameron Hurst, Asheville, NC (US)

(73) Assignee: Assurant, Inc., New York, NY (US)

( * ) Notice: Subject to any disclaimer, the term of this patent is extended or adjusted under 35 U.S.C. 154(b) by 0 days.

(21) Appl. No.: 17/815,363

(22) Filed: Jul. 27, 2022

(65) Prior Publication Data

US 2023/0013506 A1 Jan. 19, 2023

Related U.S. Application Data

(63) Continuation of application No. 16/952,648, filed on Nov. 19, 2020, now Pat. No. 11,429,506, which is a (Continued)

(51) Int. Cl.
*G06F 11/34* (2006.01)
*G06F 11/32* (2006.01)

(52) U.S. Cl.
CPC ...... *G06F 11/3409* (2013.01); *G06F 11/3428* (2013.01); *G06F 11/323* (2013.01); *G06F 11/3466* (2013.01); *G06F 2201/86* (2013.01)

(58) Field of Classification Search
CPC .... G06F 11/3409; G06F 11/323; G06F 17/40; G06F 11/3428; G06F 11/3466; G06F 11/0796; G06F 2201/86; G06N 20/00
(Continued)

(56) References Cited

U.S. PATENT DOCUMENTS 5,504,675 A 4/1996 Cragun et al.
5,717,944 A * 2/1998 Wilkinson ............ G06F 9/3802
712/E9.055
(Continued)

FOREIGN PATENT DOCUMENTS

CA 2578602 C 4/2012
JP 2002-149868 A 5/2002
(Continued)

OTHER PUBLICATIONS

Apple.com, OS X: Activity Monitor shows one CPU Usage graph on systems with more than four cores, internet article, 2012, (http://support.apple.com/kb/HT4180).
(Continued)

*Primary Examiner* — Jeffrey P Aiello
(74) *Attorney, Agent, or Firm* — Alston & Bird LLP

(57) ABSTRACT

A system is configured to track and store system and event data for various computing devices. The system is configured to associate the various computing devices with profiles based at least in part on characteristics of the computing devices. The system is further configured to compare performance data and/or performance metrics for particular computing devices having a particular profile against all other devices that share the particular profile. The system then displays this comparison to a user of the particular computing device, substantially automatically diagnoses an issue with the particular computing device based on the performance and system event data, and/or enables the user to diagnose the problem based on the performance and system event data.

17 Claims, 9 Drawing Sheets

Related U.S. Application Data continuation of application No. 16/106,588, filed on Aug. 21, 2018, now Pat. No. 10,872,022, which is a continuation of application No. 14/026,965, filed on Sep. 13, 2013, now Pat. No. 10,073,754.

(58) Field of Classification Search
USPC ............. 73/866.3; 340/539.11; 700/83; 702/62–63, 85, 104, 120, 179, 182–183, 702/186, 189; 703/6, 22; 709/219
See application file for complete search history.

(56) References Cited

U.S. PATENT DOCUMENTS

| | | | |
|---|---|---|---|
| 5,991,735 A | 11/1999 | Gerace | |
| 6,269,401 B1 | 7/2001 | Fletcher et al. | |
| 7,454,458 B2 | 11/2008 | Islam et al. | |
| 7,525,484 B2* | 4/2009 | Dupray | G01S 5/0009 342/450 |
| 7,599,293 B1 | 10/2009 | Bain et al. | |
| 8,219,983 B1 | 7/2012 | Sobel et al. | |
| 8,255,518 B2 | 8/2012 | Yahiro et al. | |
| 8,296,262 B1 | 10/2012 | Ellis, III | |
| 8,392,147 B2 | 3/2013 | Karayi et al. | |
| 8,423,638 B2 | 4/2013 | Moehler et al. | |
| 8,626,192 B1 | 1/2014 | Simonyi et al. | |
| 10,491,650 B1* | 11/2019 | Allen | G06Q 30/0201 |
| 2002/0069037 A1* | 6/2002 | Hendrickson | H04L 67/125 702/186 |
| 2003/0005072 A1 | 1/2003 | Olah et al. | |
| 2003/0110421 A1* | 6/2003 | Kurinami | G06F 11/3428 714/E11.194 |
| 2004/0019894 A1 | 1/2004 | Willard et al. | |
| 2005/0066241 A1 | 3/2005 | Gross et al. | |
| 2005/0149368 A1 | 7/2005 | Brunet et al. | |
| 2006/0212771 A1* | 9/2006 | Fabbrocino | G06F 11/0793 714/746 |
| 2007/0150581 A1* | 6/2007 | Banerjee | H04L 41/22 709/224 |
| 2007/0156706 A1 | 7/2007 | Hayes | |
| 2008/0046786 A1* | 2/2008 | Patel | G06F 11/0793 714/100 |
| 2008/0151744 A1 | 6/2008 | Yakushiji | |
| 2009/0055465 A1* | 2/2009 | DePue | H04L 43/065 709/202 |
| 2009/0182533 A1 | 7/2009 | Neuenschwander et al. | |
| 2009/0204667 A1 | 8/2009 | Diaz et al. | |
| 2009/0222549 A1 | 9/2009 | Gilbert et al. | |
| 2009/0235267 A1 | 9/2009 | McKinney et al. | |
| 2010/0058121 A1 | 3/2010 | Bouchard et al. | |
| 2010/0104122 A1 | 4/2010 | Waldmann | |
| 2010/0272258 A1 | 10/2010 | Sadovsky et al. | |
| 2010/0318986 A1 | 12/2010 | Burke et al. | |
| 2011/0040990 A1 | 2/2011 | Chan et al. | |
| 2012/0036498 A1* | 2/2012 | Akirekadu | G06F 11/3082 717/124 |
| 2012/0072576 A1* | 3/2012 | Yumerefendi | G06F 11/3476 709/224 |
| 2012/0084780 A1 | 4/2012 | Pasternak | |
| 2012/0166430 A1 | 6/2012 | Bakalov | |
| 2012/0209654 A1 | 8/2012 | Romagnino et al. | |
| 2012/0317565 A1 | 12/2012 | Carrara et al. | |
| 2013/0013953 A1* | 1/2013 | Eck | G06F 11/0712 718/1 |
| 2013/0115945 A1 | 5/2013 | Holostov et al. | |
| 2013/0122854 A1 | 5/2013 | Agarwal et al. | |
| 2013/0196685 A1* | 8/2013 | Griff | H04W 4/02 455/456.1 |
| 2013/0198373 A1 | 8/2013 | Zalmanovitch et al. | |
| 2013/0204911 A1 | 8/2013 | Chaterjee et al. | |
| 2014/0059388 A1 | 2/2014 | Patiev et al. | |
| 2014/0115514 A1 | 4/2014 | Hackborn et al. | |
| 2014/0136529 A1 | 5/2014 | Zhang et al. | |
| 2014/0188778 A1 | 7/2014 | Garvey et al. | |
| 2014/0189097 A1 | 7/2014 | Sidi et al. | |
| 2015/0032365 A1* | 1/2015 | Lennen | G01S 19/34 701/410 |
| 2018/0225960 A1* | 8/2018 | Al-Ali | G06F 11/30 |
| 2021/0182168 A1 | 6/2021 | Brewer et al. | |

FOREIGN PATENT DOCUMENTS

| | | |
|---|---|---|
| JP | 2005-109901 A | 4/2005 |
| JP | 2007-323193 A | 12/2007 |
| JP | 2013-502181 A | 2/2011 |
| JP | 4663726 B2 | 4/2011 |
| JP | 2011-257834 A | 12/2011 |
| WO | 2011/020060 A2 | 2/2011 |
| WO | 2013/001609 A1 | 1/2013 |
| WO | 2013/078541 A1 | 6/2013 |

OTHER PUBLICATIONS

Bruzzese, System Recovery and Diagnostic Tricks: Reliability and Performance Monitor, internet article, Jul. 2008, (http://searchitchannel.techtarget.com/feature/System-Recovery-and-Diagnostic-Tricks-Reliability-and-Performance-Monitor).

Communication about intention to grant a European patent received for European Application No. 14843613.2, dated May 27, 2022, 6 pages.

Decision to grant a European patent received for European Application No. 14843613.2, dated Aug. 25, 2022, 2 pages.

Extended European Search Report from corresponding European Patent Application No. 14843613.3 dated Jun. 21, 2017, 12 pages.

Flinn et al., PowerScope: A Tool for Profiling the Energy Usage of mobile Applications, internet article, 1999, (http://notrump.eecs.umich.edu/group/papers/pscope99.pdf).

International Preliminary Report on Patentability dated Sep. 11, 2015 from corresponding PCT Application No. PCT/US14/55429.

International Search Report, dated Dec. 4, 2014, from corresponding International Application No. PCT/US14/55429.

Kaushik, How to Record CPU and Memory Usage Over Time in Windows?, internet article, Dec. 31, 2012, (http://www.instantfundas.com/2012/03/how-to-record-cpu-and-memory-usage-over.html).

Non-Final Rejection dated Feb. 25, 2016 for U.S. Appl. No. 14/026,965.

Saito, Kunikazu; "Let US Confirm Communication Speed—300 apps to effectively Use your Smartphone"; Shuwa System Co., Ltd. 1st Ed., p. 121, published on Sep. 10, 2012; ISBN:978-4-7980-3469-0.

Written Opinion of the International Searching Authority, dated Dec. 4, 2014, from corresponding International Application No. PCT/US14/55429.

Office Action for Brazil Application No. BR112016007759-8 dated Dec. 6, 2022 (4 pages).

PassMark Software, Performance Test, Easy PC benchmarking, Dec. 2012 (1 page), http://www.passmark.com/products/pt.htm.

Extended European Search Report for EP Application No. 22195380.5 dated Jan. 4, 2023 (9 pages).

English Translation of JP Office Action dated Mar. 7, 2023 for JP Application No. 2021190217, 6 page(s).

JP Office Action dated Mar. 7, 2023 for JP Application No. 2021190217, 6 page(s).

* cited by examiner

SYSTEMS AND METHODS FOR COLLECTING, TRACKING, AND STORING SYSTEM PERFORMANCE AND EVENT DATA FOR COMPUTING DEVICES

CROSS-REFERENCE TO RELATED APPLICATIONS

This application is a continuation of U.S. Non-Provisional patent application Ser. No. 16/952,648 titled "SYSTEMS AND METHODS FOR COLLECTING, TRACKING, AND STORING SYSTEM PERFORMANCE AND EVENT DATA FOR COMPUTING DEVICES," FILED Nov. 19, 2020, which is a continuation of U.S. Non-Provisional patent application Ser. No. 16/106,588 titled "SYSTEMS AND METHODS FOR COLLECTING, TRACKING, AND STORING SYSTEM PERFORMANCE AND EVENT DATA FOR COMPUTING DEVICES," filed Aug. 21, 2018 (now U.S. Pat. No. 10,872,022), which is a continuation of U.S. Non-Provisional application Ser. No. 14/026,965, titled "SYSTEMS AND METHODS FOR COLLECTING, TRACKING, AND STORING SYSTEM PERFORMANCE AND EVENT DATA FOR COMPUTING DEVICES," filed Sep. 13, 2013 (now U.S. Pat. No. 10,073,754), the contents of each are incorporated herein by reference in their entireties.

BACKGROUND

When diagnosing computing issues, technicians or others may only be able to ascertain information about the computing device in its current state. This can make it difficult to determine whether the device is truly performing in a sub-standard way and, if so, what is causing the substandard performance. Accordingly, there is a need for improved systems and methods for assisting a user in assessing and/or improving the performance of computing devices.

SUMMARY

A non-transitory computer-readable medium storing computer-executable instructions for: (A) storing, in memory, time stamped performance data associated with each of a plurality of computing devices taken over time; (B) storing, in memory, time stamped event data associated with each of said plurality of computing devices taken over time; and (C) using at least said time stamped performance data and/or said event data to provide an individual associated with a first of said plurality of computing devices with a comparison of a performance of said first computing device with a typical performance of other computing devices, from said plurality of computing devices, that are similar to said first computing device. This comparison may, for example, be in the form of a longitudinal display of information that displays performance and/or event data for one or more of the computing devices (or aggregated information for a plurality of the computing devices) taken over time.

A non-transitory computer-readable medium, according to various embodiments, stores computer-executable instructions for: (A) receiving first system event data for a first computing device having a device profile, the device profile comprising one or more characteristics; (B) receiving first performance data for the first computing device; (C) receiving second system event data for at least one second computing device having the device profile; (D) receiving second performance data for the least one second computing device; and (E) enabling a user to compare the first system event data, the first performance data, the second system event data, and the second performance data.

A computer system, according to particular embodiments, comprises at least one processor. In various embodiments, the computer system is configured for: (A) receiving first data associated with a first mobile computing device, the first data comprising first performance data and at least one first system event and the first mobile computing device comprising at least one mobile device characteristic; (B) receiving second data associated with one or more second mobile computing devices, wherein the second data comprises second performance data and at least one second system event for each of the one or more second mobile computing devices; (C) establishing at least one profile, the at least one profile being associated with the at least one mobile device characteristic; (D) determining which of the one or more second computing devices has the at least one mobile device characteristic; (E) at least partially in response to determining that the one or more second computing devices have the at least one mobile device characteristic, assigning the one or more second computing devices to the profile; (F) determining whether the first computing device has the at least one mobile device characteristic; and (G) displaying the first data and the second data of the one or more second computing devices assigned to the profile to a user of the first mobile device.

A computer-implemented method, according to various embodiments, comprises receiving, by a processor, system event data and system performance data for a plurality of computing devices. In particular embodiments, the plurality of computing devices comprise a first computing device associated with first system event data and first system performance data and share at least one profile based at least on one or more characteristics of the plurality of computing devices. In various embodiments, the computer-implemented method further comprises: determining, by a processor, an average performance metric for the plurality of computing devices based at least in part on the system event data and the system performance data; determining, by a processor, a first performance metric for the first computing device based at least in part on the first system event data and the first system performance data; and displaying, by a processor, the average performance metric and the first performance metric to a user of the first computing device.

BRIEF DESCRIPTION OF THE DRAWINGS

Various embodiments of a system and method for collecting, tracking, and storing performance and system information for computing devices are described below. In the course of this description, reference will be made to the accompanying drawings, which are not necessarily drawn to scale, and wherein.

DETAILED DESCRIPTION

Figure 1:
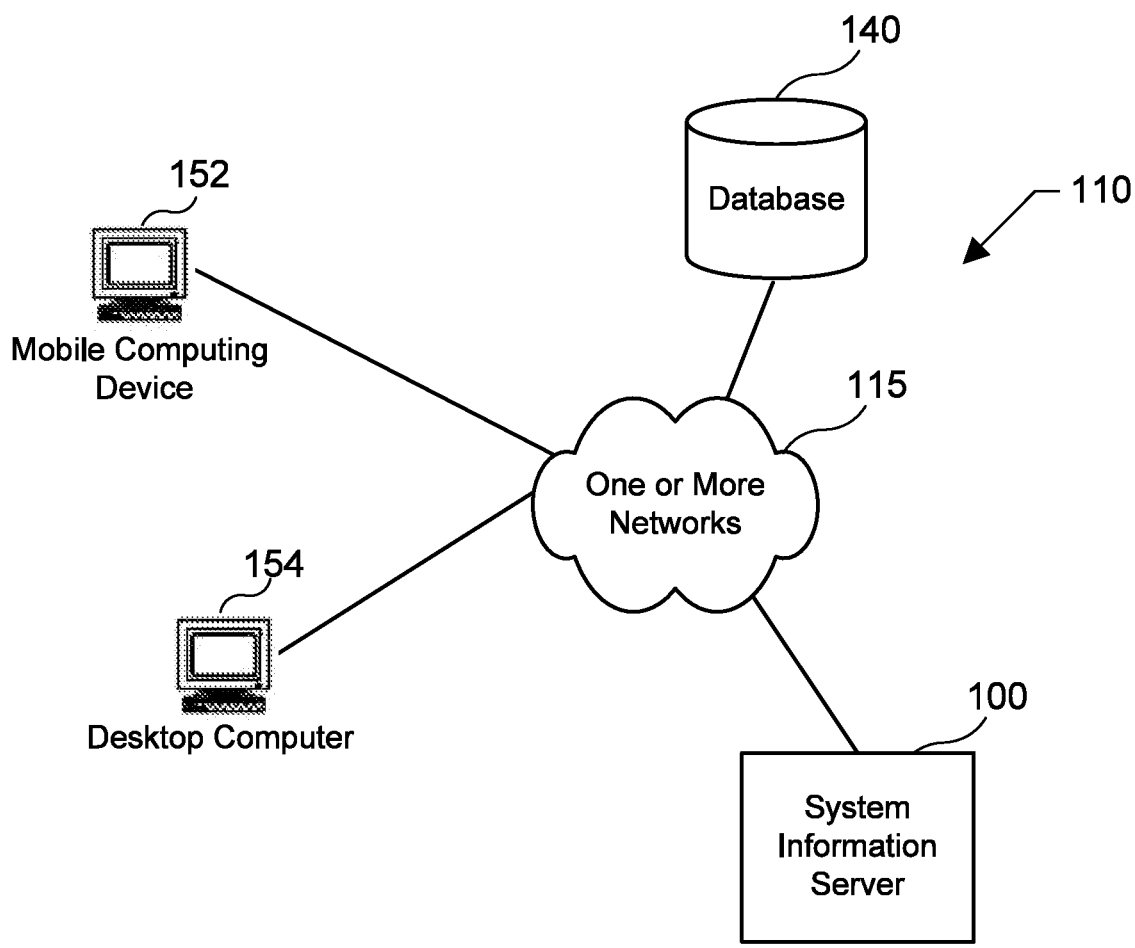
FIG. 1 is a block diagram of a computing device diagnostic system in accordance with an embodiment of the present system.

Various embodiments now will be described more fully hereinafter with reference to the accompanying drawings. It should be understood that the invention may be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Overview

In various embodiments, a system and method for collecting, tracking, and storing performance and system information for computing devices (e.g., desktop computers, mobile computing devices such as tablet computers, smartphones, etc.) is configured to store system and performance information for one or more computing devices (e.g., one or more similar computing devices) and in particular for mobile computing devices. In various embodiments, the computing device performance information includes any suitable performance information such as, for example, battery usage, processor resource usage, etc. for the computing device. The computing device system information may include any suitable system information (e.g., event information), such as, for example: (1) signal level changes (e.g., a change in signal strength in a connection to a wireless network); (2) information about newly installed software; (3) a log of peripheral devices that have been connected to or disconnected from the computing device (e.g., such as printers, scanners, smartphones, etc. via usb, firewire or other suitable port associated with the computing device); (4) information about what computer networks the computing device has connected and/or disconnected from; (5) any websites visited via the computing device, etc.

In various embodiments, the system collects and stores this information at substantially regular intervals (e.g., daily, weekly, hourly, or any other suitable interval). In other embodiments, the system is configured to collect data substantially automatically as events occur. For example, in the case of a smartphone, the system may collect information about a system event related to the installation of a new software application on the smartphone. The system event data in this example may include, for example, a publisher of the software application, a version of the software application, or any other information related to the software application. In various embodiments, the collected information may be used to provide a longitudinal view of the computing device's performance and system information (e.g., snapshots or other depictions of the performance and system information over time).

In particular embodiments, the system is configured to store and transmit the collected information to, for example, a cloud storage server or other server for later retrieval. The system may be configured to transmit the information at substantially regular intervals, in response to a pre-determined event, such as in response to determining that the device is idle and charging, or at any other suitable time.

The system, in various embodiments, is configured to provide this information to a user that is troubleshooting performance issues on a particular computing device. In particular embodiments, the system provides this information for only the particular computing device being troubleshot. In other embodiments, the system is configured to provide this information for the computer being troubleshot as well as information (e.g., aggregated information) associated with computing devices that are similar to the computing device at issue. These similar computing devices may include, for example: (1) similar device manufacturers and models; (2) devices having similar hardware configurations (e.g., such as similar processors, similar amounts of RAM, etc.); (3) similar types of computing devices (e.g., other tablet computers, other smartphones, etc.); (4) computing devices located in similar geographic areas; (5) computing devices running similar software; (6) computing devices connected via similar or the same networks (e.g., particular Local Area Networks, cellular telephone networks, etc.); (7) computing devices with similar connected peripherals; (8) computing devices running similar operating systems; and/or (9) or any other suitable similar computing devices. In various embodiments, comparison of device performance to performance of similar other devices (e.g., average performance of similar devices) may enable the system to provide a relative performance of a particular device versus actual performance of similar devices (e.g., as opposed to comparison to a pre-determined baseline performance metric)

In various embodiments, the system is configured to enable a technician to diagnose or troubleshoot the computing device based at least in part on the information (e.g., the performance information and/or the system information). For example, the system may display historical computing device performance information as well as system information that may be used to enable a technician or other user to determine which particular events (e.g., installation of particular software, etc.) may have caused a decrease in device performance. In other embodiments, the system is configured to substantially automatically diagnose or troubleshoot the computing device based at least in part on the performance and system information. In various embodiments, the information may reveal that the computing device is infected by malicious software (e.g., viruses, spyware, adware, etc.), that the computing device needs to be defragmented, that the computing device is suffering from thermal fatigue or that the computing device's processor or battery is suffering from other suitable hardware failures. In various embodiments, the system is configured to substantially automatically correct any problem diagnosed based on the information.

Exemplary Technical Platforms

As will be appreciated by one skilled in the relevant field, the present invention may be, for example, embodied as a computer system, a method, or a computer program product. Accordingly, various embodiments may take the form of an entirely hardware embodiment, an entirely software embodiment, or an embodiment combining software and hardware aspects. Furthermore, particular embodiments may take the form of a computer program product stored on a computer-readable storage medium having computer-readable instructions (e.g., software) embodied in the storage medium. Various embodiments may take the form of web-implemented computer software. Any suitable computer-readable storage medium may be utilized including, for example, hard disks, compact disks, DVDs, optical storage devices, and/or magnetic storage devices.

Various embodiments are described below with reference to block diagrams and flowchart illustrations of methods, apparatuses (e.g., systems) and computer program products. It should be understood that each block of the block diagrams and flowchart illustrations, and combinations of blocks in the block diagrams and flowchart illustrations, respectively, can be implemented by a computer executing computer program instructions. These computer program instructions may be loaded onto a general purpose computer, special purpose computer, or other programmable data processing apparatus to produce a machine, such that the instructions which execute on the computer or other programmable data processing apparatus to create means for implementing the functions specified in the flowchart block or blocks.

These computer program instructions may also be stored in a computer-readable memory that can direct a computer or other programmable data processing apparatus to function in a particular manner such that the instructions stored in the computer-readable memory produce an article of manufacture that is configured for implementing the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Accordingly, blocks of the block diagrams and flowchart illustrations support combinations of mechanisms for performing the specified functions, combinations of steps for performing the specified functions, and program instructions for performing the specified functions. It should also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and other hardware executing appropriate computer instructions.

Example System Architecture

FIG. 1 is a block diagram of a System 110 according to a particular embodiment. As may be understood from this figure, the System 110 includes one or more computer networks 115, a System Information Server 100, a Database 140, and one or more remote computing devices such as mobile computing device 156 (e.g., such as a smart phone, a tablet computer, a wearable computing device, a laptop computer, etc.) or a desktop computer 154. In particular embodiments, the one or more computer networks facilitate communication between the System Information Server 100, Database 140, and one or more remote computing devices 152, 154.

The one or more computer networks 115 may include any of a variety of types of wired or wireless computer networks such as the Internet, a private intranet, a mesh network, a public switch telephone network (PSTN), or any other type of network (e.g., a network that uses Bluetooth or near field communications to facilitate communication between computers). The communication link between System Information Server 100 and Database 140 may be, for example, implemented via a Local Area Network (LAN) or via the Internet.

Figure 2:
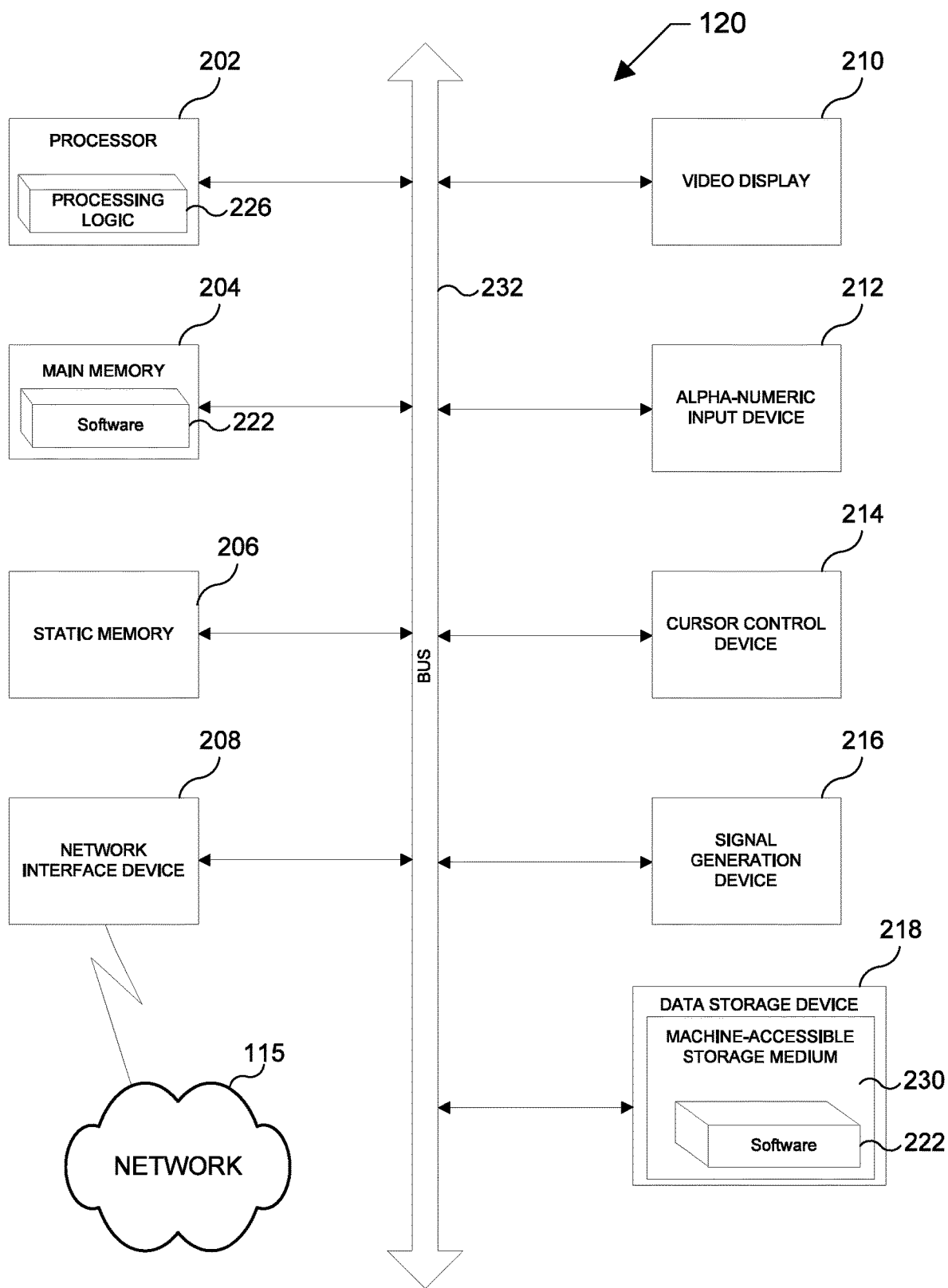
FIG. 2 is a schematic diagram of a computer, such as the system information server of FIG. 1, that is suitable for use in various embodiments.

FIG. 2 illustrates a diagrammatic representation of a computer architecture 120 that can be used within the System 110, for example, as a client computer (e.g., one of client computers 152, 154 shown in FIG. 1), or as a server computer (e.g., System Information Server 100 shown in FIG. 1). In particular embodiments, the computer 120 may be suitable for use as a computer within the context of the System 110 that is configured for collecting, tracking, and storing performance and system information for computing devices.

In particular embodiments, the computer 120 may be connected (e.g., networked) to other computers in a LAN, an intranet, an extranet, and/or the Internet. As noted above, the computer 120 may operate in the capacity of a server or a client computer in a client-server network environment, or as a peer computer in a peer-to-peer (or distributed) network environment. The Computer 120 may be a desktop personal computer (PC), a tablet PC, a set-top box (STB), a Personal Digital Assistant (PDA), a cellular telephone, a web appliance, a server, a network router, a switch or bridge, or any other computer capable of executing a set of instructions (sequential or otherwise) that specify actions to be taken by that computer. Further, while only a single computer is illustrated, the term "computer" shall also be taken to include any collection of computers that individually or jointly execute a set (or multiple sets) of instructions to perform any one or more of the methodologies discussed herein.

An exemplary computer 120 includes a processing device 202, a main memory 204 (e.g., read-only memory (ROM), flash memory, dynamic random access memory (DRAM) such as synchronous DRAM (SDRAM) or Rambus DRAM (RDRAM), etc.), a static memory 206 (e.g., flash memory, static random access memory (SRAM), etc.), and a data storage device 218, which communicate with each other via a bus 232.

The processing device 202 represents one or more general-purpose processing devices such as a microprocessor, a central processing unit, or the like. More particularly, the processing device 202 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. The processing device 202 may also be one or more special-purpose processing devices such as an application specific integrated circuit (ASIC), a field programmable gate array (FPGA), a digital signal processor (DSP), network processor, or the like. The processing device 202 may be configured to execute processing logic 226 for performing various operations and steps discussed herein.

The computer 120 may further include a network interface device 208. The computer 120 also may include a video display unit 210 (e.g., a liquid crystal display (LCD) or a cathode ray tube (CRT)), an alphanumeric input device 212 (e.g., a keyboard), a cursor control device 214 (e.g., a mouse), and a signal generation device 216 (e.g., a speaker).

The data storage device 218 may include a non-transitory computer-accessible storage medium 230 (also known as a non-transitory computer-readable storage medium or a non-transitory computer-readable medium) on which is stored one or more sets of instructions (e.g., software 222) embodying any one or more of the methodologies or functions described herein. The software 222 may also reside, completely or at least partially, within the main memory 204 and/or within the processing device 202 during execution thereof by the computer 120—the main memory 204 and the processing device 202 also constituting computer-accessible storage media. The software 222 may further be transmitted or received over a network 115 via a network interface device 208.

While the computer-accessible storage medium 230 is shown in an exemplary embodiment to be a single medium, the term "computer-accessible storage medium" should be understood to include a single medium or multiple media (e.g., a centralized or distributed database, and/or associated caches and servers) that store the one or more sets of instructions. The term "computer-accessible storage medium" should also be understood to include any medium that is capable of storing, encoding or carrying a set of instructions for execution by the computer and that cause the computer to perform any one or more of the methodologies of the present invention. The term "computer-accessible storage medium" should accordingly be understood to include, but not be limited to, solid-state memories, optical and magnetic media, etc.

Exemplary System Platform

Various embodiments of a system and method for collecting, tracking, and storing performance and system information for computing devices may be implemented within the context of any suitable system information service. In particular embodiments, the system may be implemented as part of an insurance service such as a service for insuring computing devices, for example, to ensure that the computing devices are functioning properly or may require replacement. In particular embodiments, the system may be provided by an insurance carrier that insures computing devices to customers of the insurance service (e.g., for use with computing devices that the customers inure through the insurance service). Various aspects of the system's functionality may be executed by certain system modules, including a System Diagnostics Module 300, which may, for example, be executed by a software application running on a mobile computing device (e.g., a cellular phone or tablet computer) or other computing device. This module is discussed in greater detail below.

System Diagnostics Module

Figure 3:
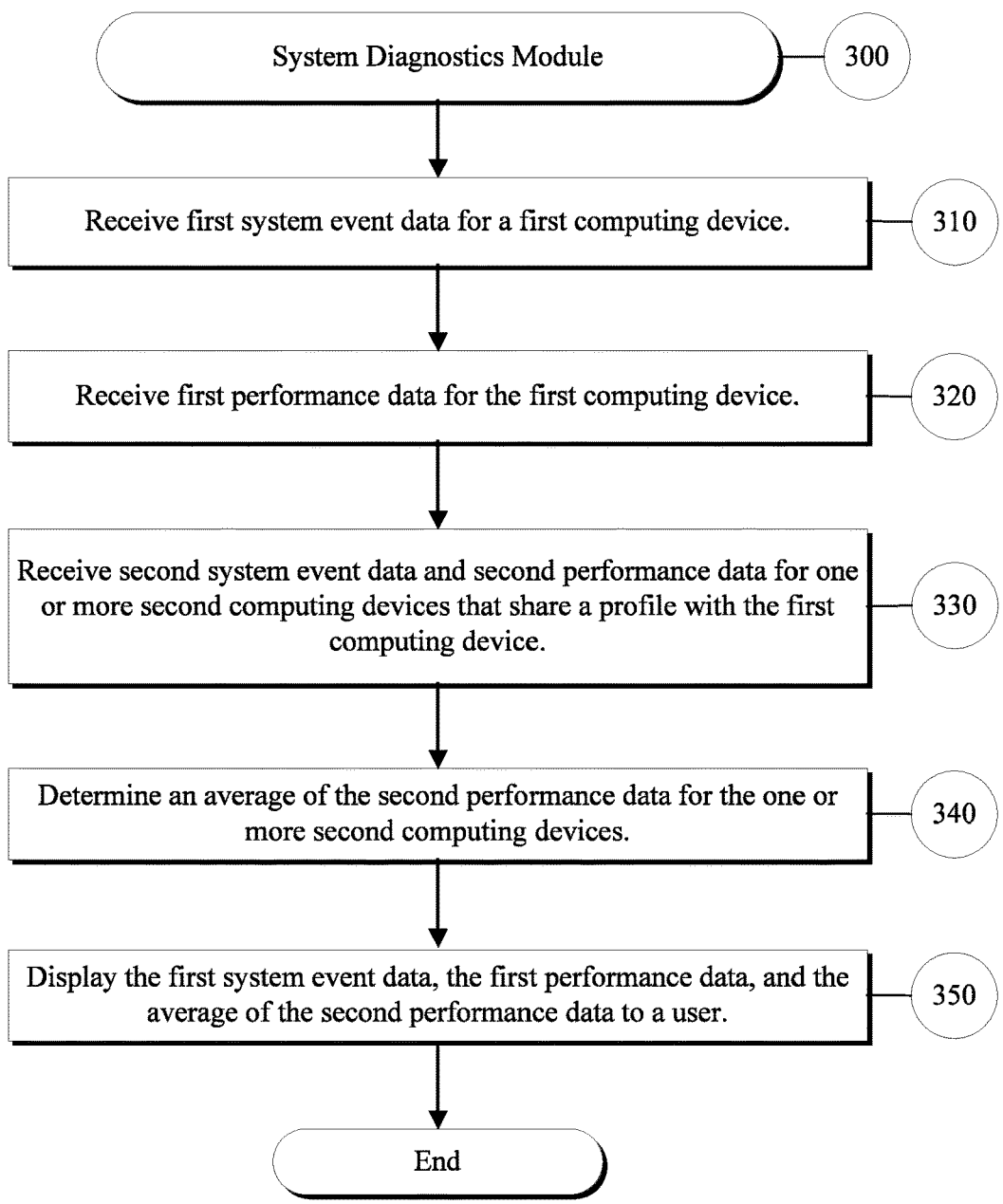
FIG. 3 depicts a flow chart that generally illustrates various steps executed by a system diagnostic modules that, for example, may be executed by the system information server of FIG. 1.

FIG. 3 is a flow chart of operations performed by an exemplary System Diagnostics Module 300. In particular embodiments, the System Diagnostics Module 300 may facilitate collecting, tracking, and storing performance and system information for at least one computing device and provide that information to a technician or other user for the purpose of diagnosing performance issues with the computing device and/or monitoring the current performance of the device relative to the device's past performance, or relative to the performance of other, similar devices. In various embodiments, the System Diagnostics Module 300 is executed as part of a software application stored locally on computing device (e.g., a mobile computing device).

When executing the System Diagnostics Module 300, the system begins, at Step 310, by receiving first system event data for a first computing device. In particular embodiments, the system event data may include one or more system events, which may, for example, be associated with a time (e.g., a date and time) at which the one or more events occurred. In a generic example, the system event data may include time-stamped data regarding a first event which occurred at a first time, a second event which occurred at a second time, and so on. In various embodiments, the one or more events may be at least somewhat related (e.g., by type of event, etc.). In particular embodiments, the system event data may include a log of system events that is populated, essentially in real time, over time.

In various embodiments, the system event data includes a change in signal level for a connection between the first computing device and one or more networks (e.g., a wireless local area network, a cellular telephone network, etc.). A system event may include, for example, a change in signal level from two bars to three bars for a connection between the first computing device (e.g., a smartphone) and a particular cellular telephone network (e.g., Verizon®, At&t®, Sprint®, etc.). In other embodiments, the system event data may include any other suitable change in signal strength between the first computing device and one or more networks (e.g., a change from a weak to a strong signal, etc).

In other embodiments, system event data includes a connection to or disconnection from a particular network (e.g., a wireless network). For example, in the case of a first computing device being a smartphone, the system may receive system event data that includes information associated with a time at which the first computing device connected to a new wireless local area network. The system event data associated with a connection and/or disconnection with a particular network may further include information such as, for example: (1) security features of the network (e.g., whether the network has wireless security protocols such as WEP, WPA, WPA2 and so on); (2) whether the first computing device has connected to the network before (e.g., whether the network is a familiar network); (3) a signal strength between the first computing device and the network; (4) or any other suitable information associated with the first computing device's connection to the network.

In various embodiments, the system event data may include data about activation and deactivation of various features of the computing device. In particular embodiments, this may include, for example, turning airplane mode on or off for the first computing device, turning Bluetooth on or off for the first computing device, turning GPS (e.g., location based-services) on or off for the first computing device, etc.

In particular embodiments, the system event data may include data associated with newly installed software on the first computing device. For example, the system may receive system event data that includes a date and time at which a new software application was installed on the first computing device. In various embodiments, the system event data in such cases may further include a file size of the software application, a publisher of the software application, a source from which the software application was installed (e.g., a website from which the software was downloaded, etc.). In other embodiments, system event data may further include information about software removal from the first computing device (e.g., a system event may include deletion of a particular software application from the first computing device).

In particular embodiments, the system event data includes a log of peripheral devices (e.g., printers, scanners, external hard disks, optical drives, and so on) that have been connected to or disconnected from the first computing device (e.g., via USB, firewire, wireless network, or other suitable mechanism that the first computing device includes for communicating with peripheral devices). In various embodiments, the system event data includes a time at which the peripheral devices were connected and/or disconnected, information associated with any device driver or other software installed on the first computing device in association with the peripheral device, or any other suitable information related to the peripheral device (e.g., device type, model number, manufacturer, etc.). For example, the system may store information associated with a new printer installed on the computing device at least partially in response to the installation of the new printer. The information associated with the new printer may include, for example, a port on the computing device via which the printer is connected to the computing device, driver information installed to enable the computing device to communicate with the printer, software installed on the computing device for use with the printer, etc.

In various embodiments, the system event data includes a log of any web pages accessed by the first computing device (e.g., a browsing history of the first computing device), which may, for example, include a time at which various web pages were accessed. In other embodiments, the system event data may include other data related to web-browsing, such as, for example, cookie data (e.g., a time at which a particular cookie was created and the contents of the cookie), cache, or other suitable data.

In particular embodiments, the first computing device is a mobile computing device (e.g., such as a smartphone, laptop, tablet computer, etc.). In other embodiments, the first computing device is a desktop computer. In particular embodiments, the system is configured to receive the system event data via an application on the first computing device that is configured to log and/or store system event data (e.g., as system events occur). In particular embodiments, the system is configured to receive the system event data substantially automatically as events occur. For example, the system may store information associated with a hands-free Bluetooth headset in response to a pairing of the headset with a smartphone. The system event data in such a case may include, for example, a make and model of the Bluetooth headset, a time at which the pairing occurred, a battery life of Bluetooth headset, or any other suitable information related to the Bluetooth headset or the pairing.

In various embodiments, the system is configured to store the system event data locally (e.g., on the first computing device). For example, a software application stored on the first computing device may at least temporarily store the system event data. In other embodiments, the system is configured to store the system event data locally and transmit the system event data to, for example, a cloud storage server or other server or other suitable remote storage location for later retrieval. In particular embodiments, the system is configured to transmit the system event data at substantially regular intervals (e.g., daily, twice a day, every six hours, or any other suitable time interval). In other embodiments, the system is configured to transmit the system event data in response to a pre-determined events, such as in response to determining that the first computing device is plugged into an external power source (e.g., the first computing device is plugged in and charging in the case of a first computing device that is a smart phone). In still other embodiments, the system is configured to transmit the system event data in response to determining that the first computing device is connected to the internet (e.g., via a wireless local area network, a particular wireless local area network, a cellular telephone network, etc.). In a particular embodiment, the system is configured to transmit the system event data in response to determining that the first computing device is plugged into an external power source and connected to the internet via a wireless local area network (e.g., as opposed to a cellular telephone network via 3 g, 4 g, etc.).

Returning to Step 320, the system continues by receiving first performance data for the first computing device. In various embodiments, the first performance data includes battery usage (e.g., rate of drainage, charge level, etc.), processor resource usage, clock rate, million floating-point operations per second (MFLOPS), storage usage, data usage (e.g., amount of mobile data versus Wi-Fi data usage), or any other suitable performance metric or benchmark relevant to the first computing device's performance. In various embodiments, the first performance data is received at substantially the same time (e.g., and associated with) a particular system event data point received at Step 310. For example, battery usage may be received as system performance data for a time when system event data indicates that the first computing device is out-of-network (e.g., not currently connected to a wireless network but actively searching for one, which may, for example, use more of the first computing device's available battery life). In particular embodiments, system performance data may include an average performance over a particular amount of time (e.g., average processor usage over a day, average time for battery to drain to a particular level, etc.). In particular embodiments, the system is configured to user the performance information to create a log of time-stamped performances records for the device.

In various embodiments, the system is configured to define performance metrics based at least in part on the first performance data. For example, the performance metrics may be based at least in part on a combination of two or more performance data points such as, for example, the types of performance data discussed immediately above. For example, a particular performance metric may be based at least in part on both battery usage and processor usage. In various embodiments, the system may be configured to define performance metrics based on any other suitable factors.

The system then, at Step 330, receives second system event data and second performance data for one or more second computing devices that share a profile with the first computing device. In various embodiments, the second system event data may be any suitable system event data associated with the one or more second computing devices, such as, for example, any of the first system event data described above with respect to the first computing device (e.g., at Step 310). In particular embodiments, the second performance data may be any suitable performance data associated with the one or more second computing devices, such as, for example, any of the types of first performance data described above with respect to the first computing device (e.g., at Step 320).

In various embodiments, the one or more second computing devices that share at least one profile with the first computing device are computing devices that have one or more characteristics in common with the first computing device (e.g., are the same type of device, are the same model of device, run similar software to the first computing device, and/or has a similar operating system to the first computing device, etc.). In particular embodiments, the system is configured to establish the at least one profile based at least in part on one or more characteristics of the various computing devices (e.g., by substantially automatically determining suitable profiles, associating one or more characteristics with the profiles, and assigning any computing devices having the one or more characteristics to the associated profiles). In various embodiments, the system is configured to establish the at least one profile based at least in part on one or more characteristics of the first computing device. The system, in various embodiments, is then configured to assign computing devices (e.g., the one or more second computing devices) to particular profiles in response to determining that the computing devices have the one or more characteristics associated with the particular profiles.

In particular embodiments, the one or more characteristics include, for example, a particular hardware configuration of the first computing device (e.g., a particular processor that the first computing device includes, an amount of RAM that the first computing device has, etc.). In particular embodiments, the one or more characteristics that the system may use to assign a profile to various computing devices includes a type of computing device. For example, if the first computing device is a smartphone, the system may establish a profile for smart phones, if the first computing device is a tablet computer, the system may establish a profile for tablet computers, etc. In particular embodiments, the one or more characteristics may include particular software stored on the computing devices. For example, the system may create a profile for all computing devices that are running particular software. In other embodiments, the one or more characteristics may include an operating system of the computing devices (e.g., Windows, iOS, Android, etc.).

In various embodiments, the one or more characteristics may include a particular geographic area in which the computing devices are located. The particular geographic area may be determined based at least in part on a GPS position of the computing device or using any other suitable techniques. In particular embodiments, a geographic area of a computing device may include a network to which the first computing device is connected (e.g., a particular wireless local area network, a connection to a particular cellular tower in a particular cellular telephone network, etc.). When a computing device is connected to a particular cellular tower on a particular cellular telephone network, the system may, for example, establish a profile for all computing devices connected to the same particular cellular tower.

In various embodiments, the one or more characteristics may include having particular peripheral devices connected to the computing device (e.g., a printer, a particular brand of peripheral device, a scanner, etc.). The system may, for example, establish a profile for computing devices having a particular model printer connected via USB.

Particular profiles may also include a plurality of different device characteristics. For example, a profile may be defined as any computing device made by a particular manufacturer (e.g., Apple®, Samsung®, etc.) that is of a specific model/type, and that is running at least a particular combination of software applications.

In particular embodiments, before receiving the second system event data and second performance data for the one or more second computing devices sharing a profile with the first computing device, the system is configured to determine what profiles are associated with the first computing device and which of the one or more second computing devices are associated with those profiles. In various embodiments, the system is configured to populate a database that includes the first system event data, first performance data, second system event data, and second performance data. This database may include, for example, all relevant data for any computing devices that are part of the system. The system may then assign (e.g., or associate) data associated with computing devices that fit into a particular profile to that particular profile. The system may then use the aggregated profile data to determine an average performance of devices sharing that profile for comparison to a particular device having that profile.

For example, if the system receives system event and performance data from one hundred smartphones, the system would store that data for each of the one hundred smartphones. If ten of those one hundred smart phones were iPhone 5s, the system may create a profile for iPhone 5s that includes only the data for the ten iPhone 5s. The system may then determine an average performance of the iPhone 5s and display that average performance to a user of one of the iPhone 5s along with that user's iPhone 5's actual performance. The system may also create a second profile that includes all smartphones. When comparing the iPhone 5 user's performance to the second profile, the system may display the average performance of all 100 smartphones along with the iPhone 5 user's actual performance.

In particular embodiments, the characteristics of each particular profile are determined substantially automatically by the system. In other embodiments, profiles are established based at least in part on a request from a user to view an average performance for devices having particular characteristics (e.g., devices that share a particular characteristic with a device controlled by the user). In various embodiments, the request may come from the user of the first computing device. In other embodiments, the request may come from a person associated with a diagnostic service for determining issues with computing devices having particular profiles.

Returning to Step 340, the system continues by determining an average system performance for the one or more second computing devices (e.g., the one or more second computing devices having a particular profile). In a particular embodiment, the system is configured to determine an average performance for all devices within a particular profile. In particular embodiments, the determined average may include an aggregate of the performance metrics described above. In other embodiments, the determined average may be a simple mean of a particular piece of performance data for all the computing devices sharing a particular profile. In various embodiments, the system is configured to determine an aggregated (e.g., average) performance for all computing devices sharing a particular profile.

The system continues, at Step 350, by displaying the first event data, the first performance data, and the average of the second performance data to a user (e.g., by displaying the information on the first computing device's display screen). In various embodiments, the user is a user of the first computing device (e.g., the owner and user of a smart phone). In other embodiments, the user is a technician or other person diagnosing performance issues with the first computing device. In particular embodiments, displaying the data comprises displaying the data to the user, for example, via a graph, chart or other suitable format. For example, in particular embodiments, the system may display to owners of an iPhone 4s an average battery life of their device as well as the average battery life of other iPhone 4s users. The user may then use that data for any suitable reason, such as, for example, to determine whether they are experiencing relatively poor battery life, to determine a cause of the decrease, and potentially correct any issue causing a decrease in battery life. In particular embodiments, the data may enable a user to ascertain that a particular computing device has faulty components (e.g., one or more components may be suffering from thermal fatigue). In such embodiments, a computing device with similar event data to a second computing device that has better performance data (e.g., a computing device that is used in a similar manner to a better performing similar computing device) may require replacement of one or more components.

In various embodiments, the system is configured to enable a technician or the user of the first computing device to diagnose or troubleshoot the computing device based at least in part on the data (e.g., the performance information and/or the system information). For example, the system may display historical computing device performance information as well as some system information to enable a technician or other user to determine whether particular events (e.g., installation of particular software, etc.) may contribute to a decrease in performance.

Automatic Device Diagnosis

In various embodiments, the system is configured to substantially automatically determine issues with a computing device that may be affecting performance. In a particular example, for a user experiencing a decrease in battery life of their Samsung Galaxy S4, the system may compare application usage by that user with other Galaxy S4 users to determine that a particular software application that the user uses is not used by other users that experience better battery life. The system may then be configured to offer a solution to the user, by, for example, recommending the user delete the offending application or recommending the user limit their use of the application.

Exemplary User Experience

In a particular embodiments, a user may install a software application on their mobile computing device (e.g., on their smartphone). While the software application is running, the application may log time-stamped system event data (e.g., such as any of the system event data described in this document) and time-stamped system performance data for the mobile computing device. The software application logging the data may run substantially in the background on the mobile computing device (e.g., the application may not display anything on the mobile device while the application logs the data or otherwise notify the user as the application logs the data). When the user plugs in the mobile computing device (e.g., in order to charge a battery of the mobile computing device) and while the mobile computing device is connected to Wi-Fi, the system may transmit the logged, time-stamped data to a central server (e.g., a cloud storage server) on which the system is configured to store similar data for a plurality of computing devices.

In various embodiments, the system may associate the data for the computing devices (e.g., the data stored on the central server) with one or more profiles based on characteristics of the computing devices. The system may, for example, assign a profile to the user's smart phone that includes a profile for the make and model of smart phone. The system may then aggregate the data for all smart phones in the profile and determine an average performance for devices sharing the profile.

At any appropriate time, the user may open the software application on their mobile computing device and request to view performance data for their phone as well as comparative performance data for how their phone performs relative to other phones that share a profile with the user's smart phone. In various embodiments, the user may select or provide a profile for which the user desires to view their device's relative performance. For example, the user may request that the system display relative performance data for all devices with a particular software application installed, regardless of device type. The system may then, in response to the request, determine which of the plurality of devices have that software application installed and further determine average performance data for those similar devices for display to the user, for example, based on the data stored on the remote server. In particular embodiments, the average performance data may be broken down into a plurality of different performance categories (e.g., processing speed, strength of wireless connection, battery life, etc. . . . ).

FIGS. 4-9 are exemplary screen displays depicting various features of the system described herein. As should be understood, these screen displays may be displayed on any suitable device (e.g., a first computing device as described in the context of the System Diagnostics Module 300 above).

Figure 4:
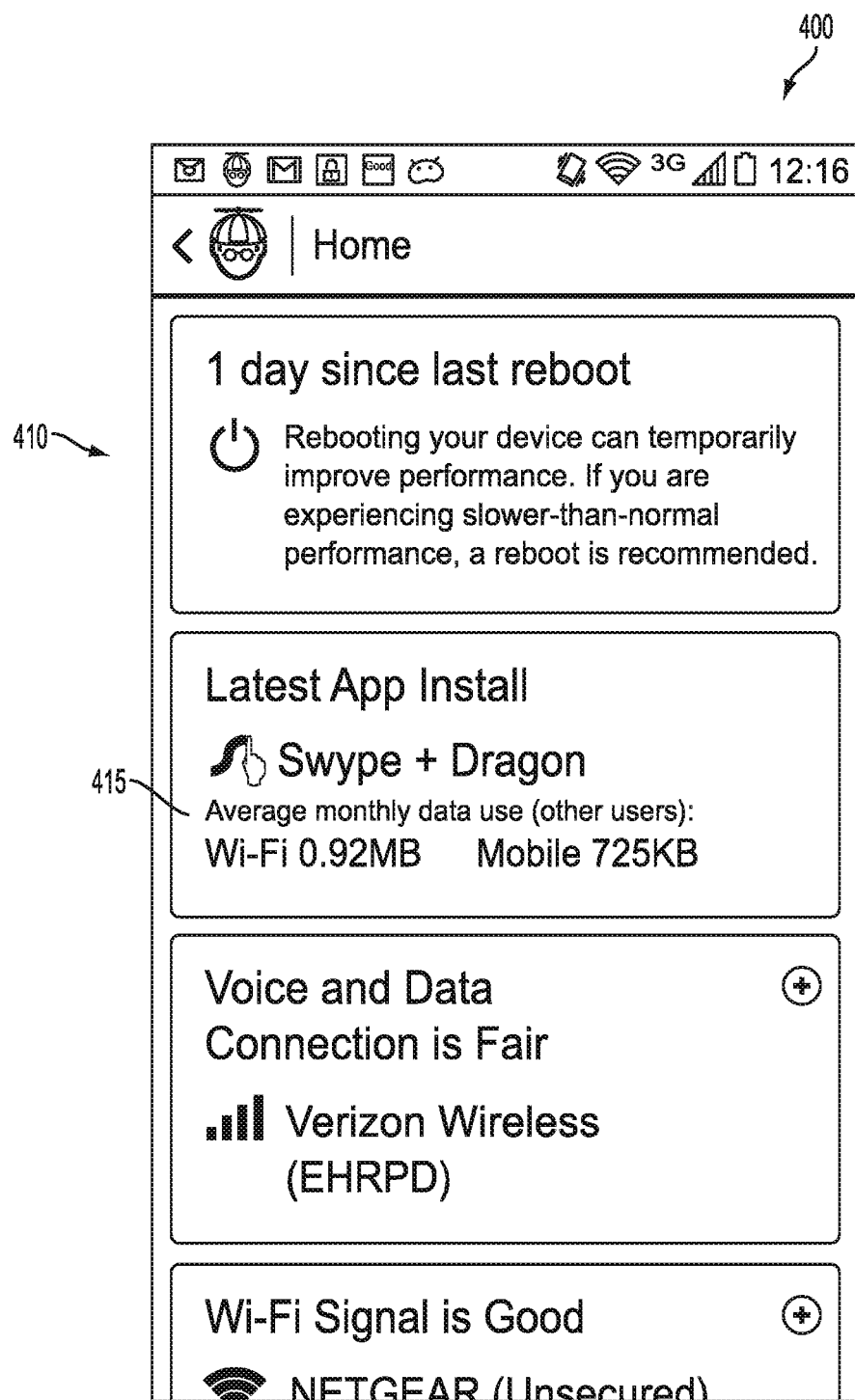
FIGS. 4-9 are exemplary screen displays of the system according to various embodiments.

FIG. 4 depicts a screen display 400 showing information 410 about a particular computing device. As shown in this figure, the information 410 includes information about a time since the last reboot of the particular computing device (e.g., 1 day) and a recommendation for improving system performance (e.g., advice that rebooting the computing device may improve system performance). The information 410 further includes information about the most recently installed application, information about connection to a voice and data network, and Wi-Fi connectivity information. The information 410 relating to the most recently installed application also includes comparative information 415 showing an average monthly data usage for other users of the latest installed application. As may be understood from this figure, the system is configured to display information 410 received from similar devices (e.g., devices that also have the particular application installed) and display the information 410 in association with a related system event for the particular computing device (e.g., installation of the particular application).

Figure 5:
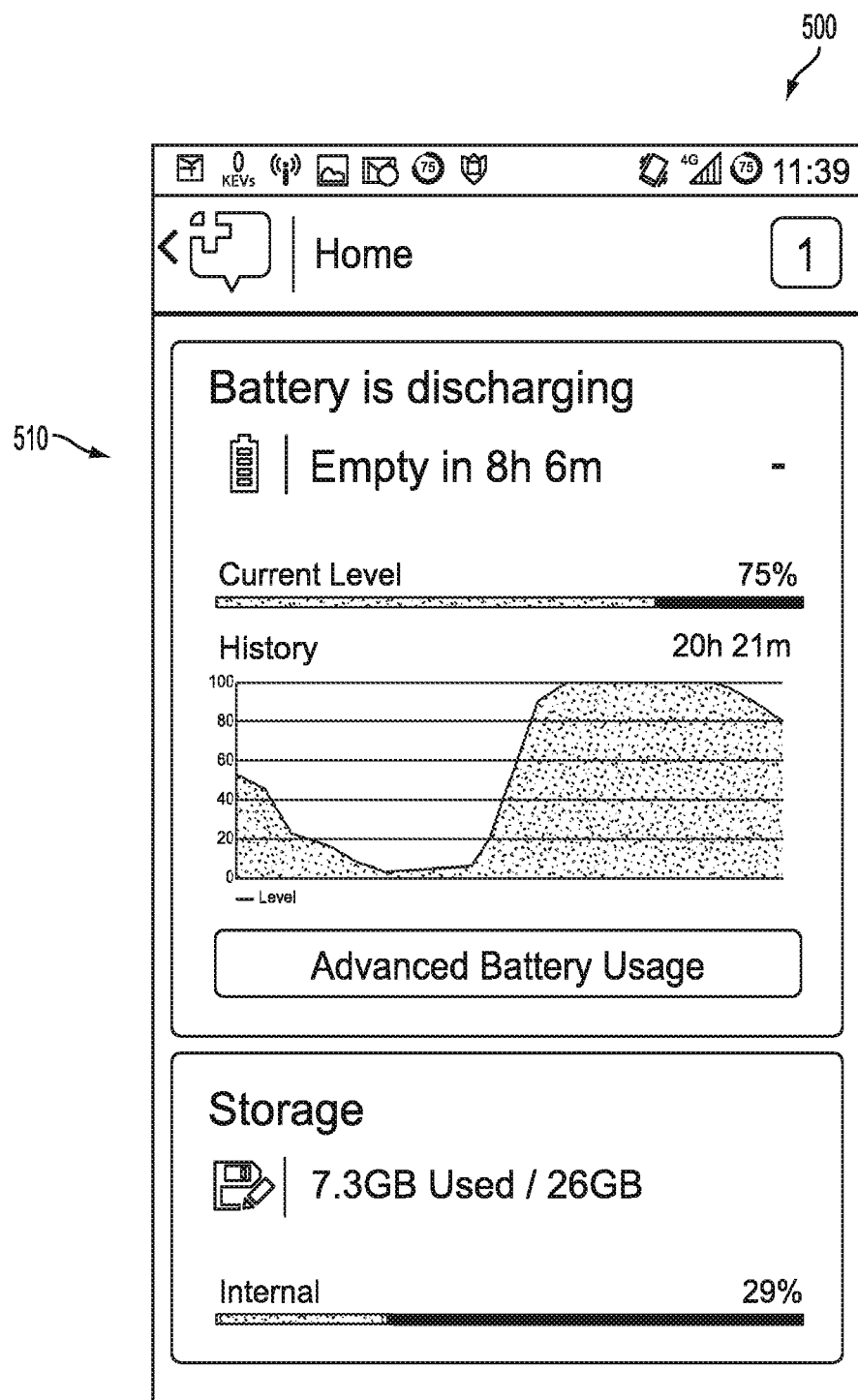
Figure 6:
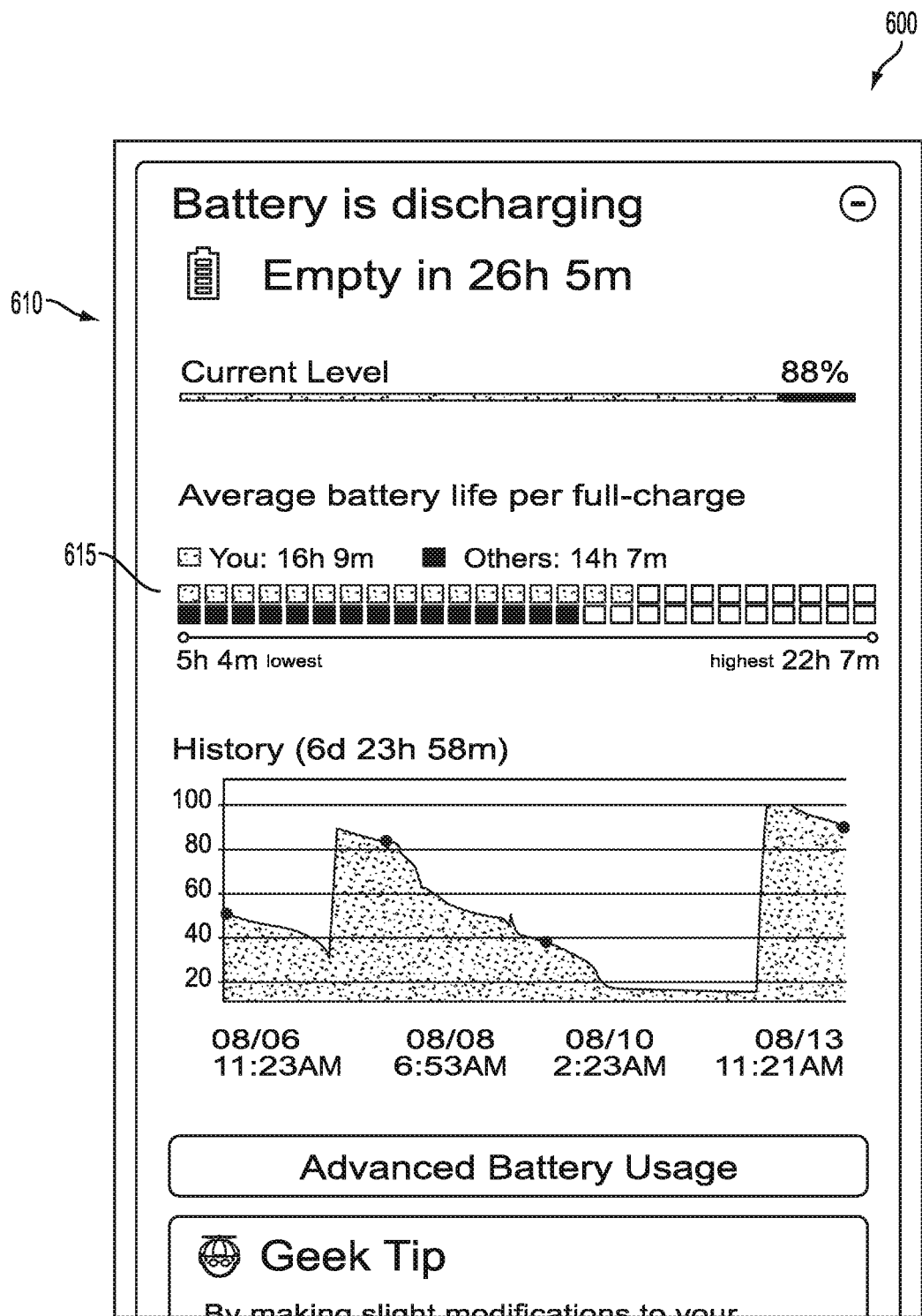

FIG. 5 depicts a screen display 500 showing current and historical battery charge levels 510. As may be understood from this figure, the system is configured to display a current battery level in addition to historical battery level over time. Battery usage, in various embodiments, is one of the many pieces of performance data that the system is configured to track over time. FIG. 6 depicts a screen display 60 showing information related to battery level 610 according to another embodiment. As shown in this figure, the system is also configured to show comparative battery life information 615 comparing the average battery life for the device on which the screen display is displayed versus an average battery life of others (e.g., others having a similar device, such as a device of the same make and model). As may be understood from this figure, the user's device for which the data is displayed has a better than average battery life per full-charge (e.g., 16 h 9 m versus 14 h 7 m).

Figure 7:
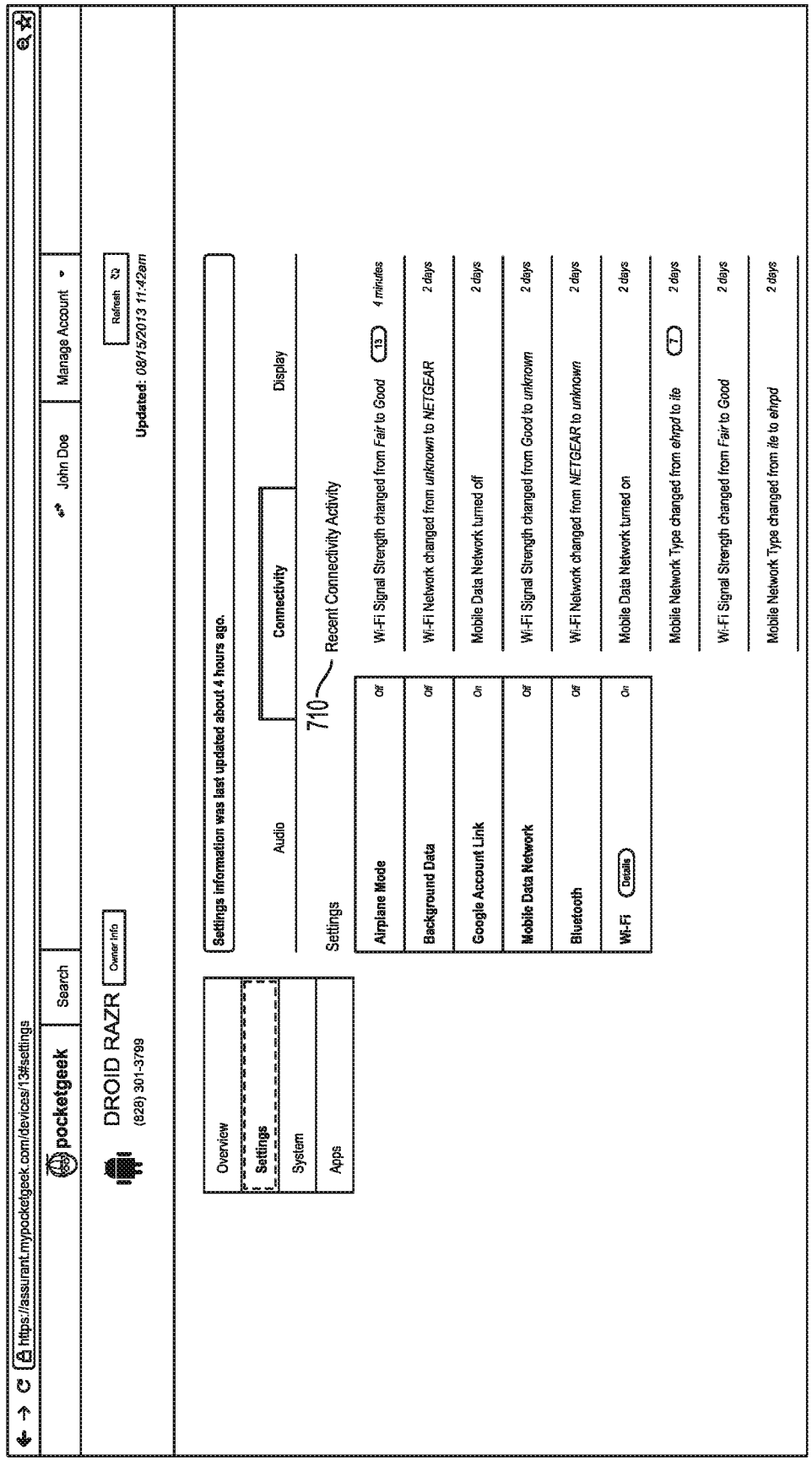
Figure 8:
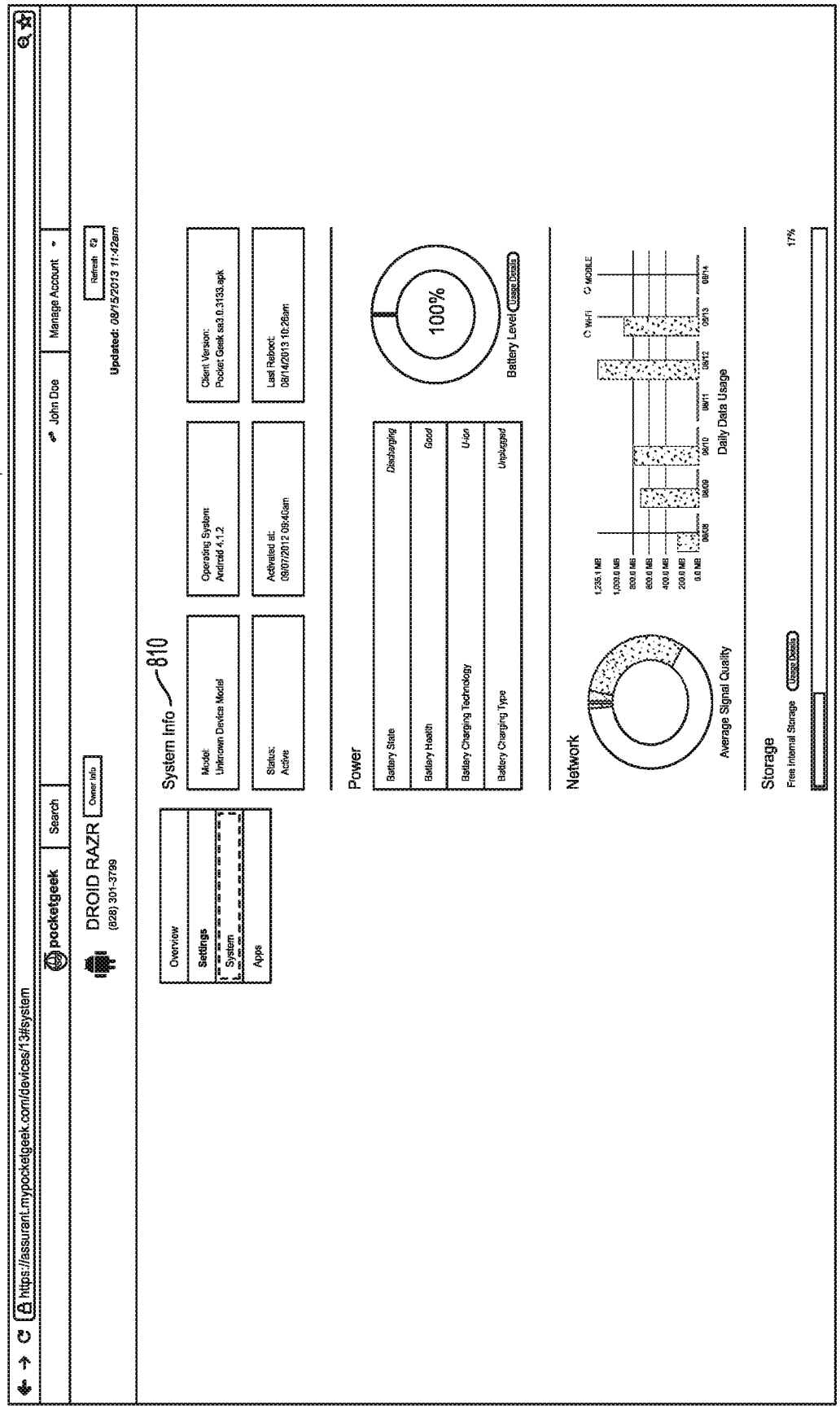

FIG. 7 depicts a screen display 700 showing recent connectivity activity 710 for a particular computing device (e.g., a DROID RAZR). As shown in the figure, the system displays recent changes in Wi-Fi signal strength, recent changes in connections to particular Wi-Fi networks, turning on and off of mobile data network, etc. As may be understood from this figure, the system logs these connectivity events as they occur and stores them for later display to the user. FIG. 8 depicts a screen display 800 showing further system information 810 which the system may be configured to display. As shown in this figure, the system information may include a model of the device, an operating system on the device, a client version, a status, activation information, information about the latest reboot of the device, etc. The system is further configured to display batter state, battery health, battery charging technology, battery charging time, battery level, network and storage information, and so on. In various embodiments, the system may use this information to identify one or more similar computing devices (e.g., computing devices that share one or more characteristics displayed as the system information 810 in FIG. 8).

Figure 9:
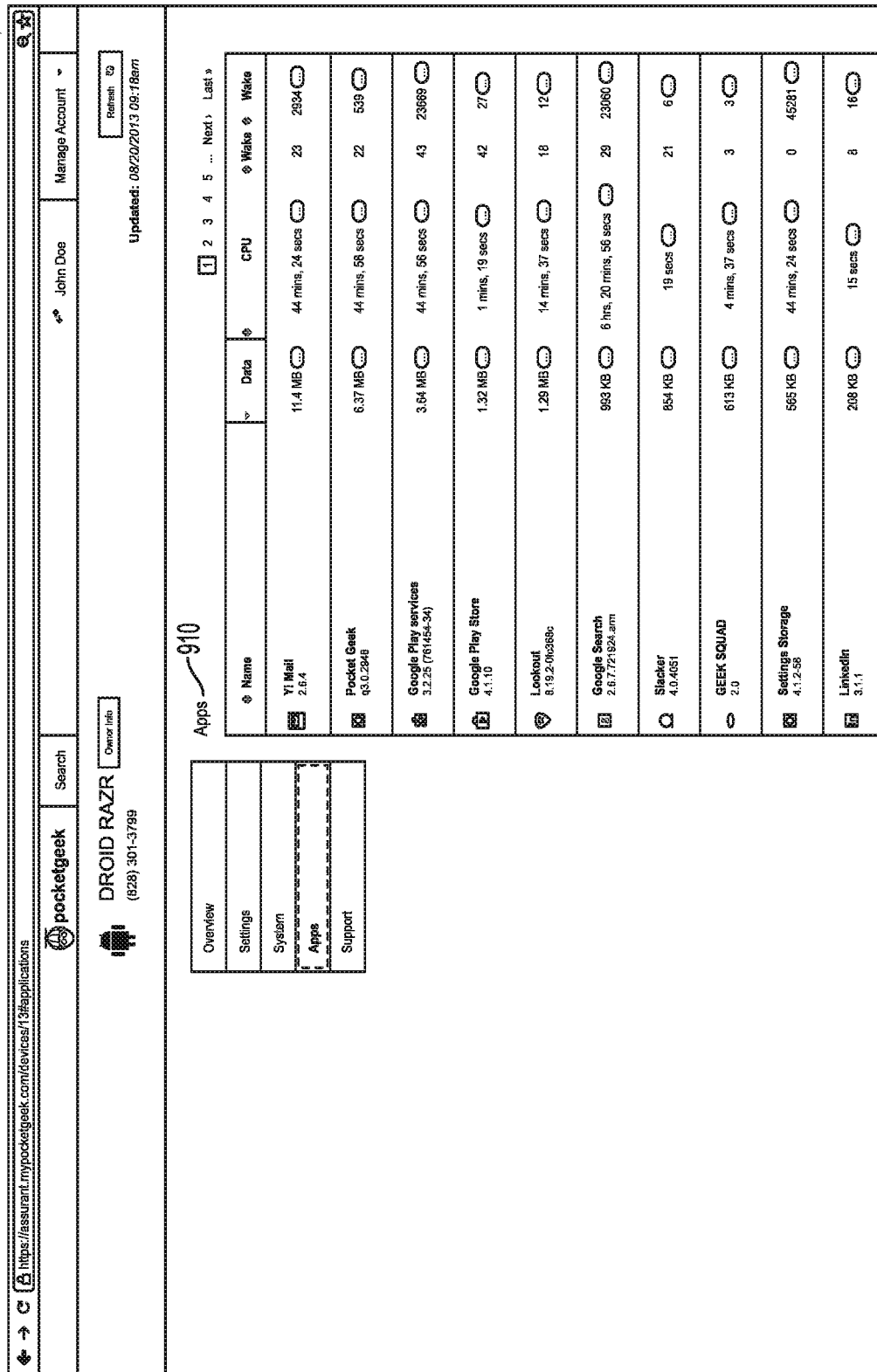

FIG. 9 depicts a screen display 900 showing application information 910 for a particular device (e.g., a particular DROID RAZR). A shown in this figure the system, for the various applications installed on the device, tracks and stores for display data usage for each application, CPU usage, and other information related to the various applications.

CONCLUSION

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims.

Although specific terms are employed herein, they are used in a generic and descriptive sense only and not for the purposes of limitation.

What is claimed is:

1. An apparatus comprising at least one processor and at least one non-transitory memory having computer-coded instructions stored thereon that, in execution with the at least one processor, causes the apparatus to:
   receive a request from a user computing device comprising at least one device characteristic;
   dynamically generate at least one device profile based at least in part on the at least one device characteristic;
   aggregate data generated from a plurality of performance data associated with a plurality of computing devices based at least in part on the at least one device profile;
   cause display of at least one representation associated with the aggregated data on the user computing device; and
   cause initiation of a responsive corrective action on the user computing device in response to a performance issue for the user computing device that is determined based at least in part on the aggregated data.

2. The apparatus according to claim 1, wherein the initiation of the responsive corrective action occurs automatically.

3. The apparatus according to claim 1, wherein the initiation of the responsive corrective action occurs in response to a selection of the responsive corrective action by a user of the user computing device.

4. The apparatus according to claim 1, wherein the user computing device comprises the at least one device characteristic, and the at least one device characteristic is automatically identified based at least in part on hardware or software of the user computing device.

5. The apparatus according to claim 1, wherein the at least one device characteristic is selected by a user of the user computing device.

6. The apparatus according to claim 1, wherein the at least one device characteristic comprises data identifying a peripheral connected to the user computing device.

7. The apparatus according to claim 1, wherein the aggregated data is determined based at least in part on a plurality of performance data corresponding to a system event.

8. The apparatus according to claim 1, the apparatus further caused to:
   receive a portion of performance data associated with another computing device; and
   store the portion of performance data associated with the another computing device,
   wherein the aggregated data is based at least in part on the portion of performance data.

9. A computer-implemented method comprising:
   receiving a request from a user computing device comprising at least one device characteristic;
   dynamically generating at least one device profile based at least in part on the at least one device characteristic;
   aggregating data generated from a plurality of performance data associated with a plurality of computing devices based at least in part on the at least one device profile;
   causing display of at least one representation associated with the aggregated data on the user computing device; and
   causing initiation of a responsive corrective action on the user computing device in response to a performance issue for the user computing device that is determined based at least in part on the aggregated data.

10. The computer-implemented method according to claim 9, wherein the initiation of the responsive corrective action occurs automatically.

11. The computer-implemented method according to claim 9, wherein the initiation of the responsive corrective action occurs in response to a selection of the responsive corrective action by a user of the user computing device.

12. The computer-implemented method according to claim 9, wherein the user computing device comprises the at least one device characteristic, and the at least one device characteristic is automatically identified based at least in part on hardware or software of the user computing device.

13. The computer-implemented method according to claim 9, wherein the at least one device characteristic is selected by a user of the user computing device.

14. The computer-implemented method according to claim 9, wherein the at least one device characteristic comprises data identifying a peripheral connected to the user computing device.

15. The computer-implemented method according to claim 9, wherein the aggregated data is determined based at least in part on a plurality of performance data corresponding to a system event.

16. The computer-implemented method according to claim 9, the computer-implemented method further comprising:
   receiving a portion of performance data associated with another computing device; and
   storing the portion of performance data associated with the another computing device,
   wherein the aggregated data is based at least in part on the portion of performance data.

17. A computer program product comprising at least one non-transitory computer-readable storage medium having computer program code stored thereon that, in execution with at least one processor, configures the computer program product for:
   receiving a request from a user computing device comprising at least one device characteristic;
   dynamically generating at least one device profile based at least in part on the at least one device characteristic;
   aggregating data generated from a plurality of performance data associated with a plurality of computing devices based at least in part on the at least one device profile;
   causing display of at least one representation associated with the aggregated data on the user computing device; and
   causing initiation of a responsive corrective action on the user computing device in response to a performance issue for the user computing device that is determined based at least in part on the aggregated data.

* * * * *